(No Model.)
P. E. McDONNELL.
DRAFT EQUALIZER.
No. 319,501. Patented June 9, 1885.
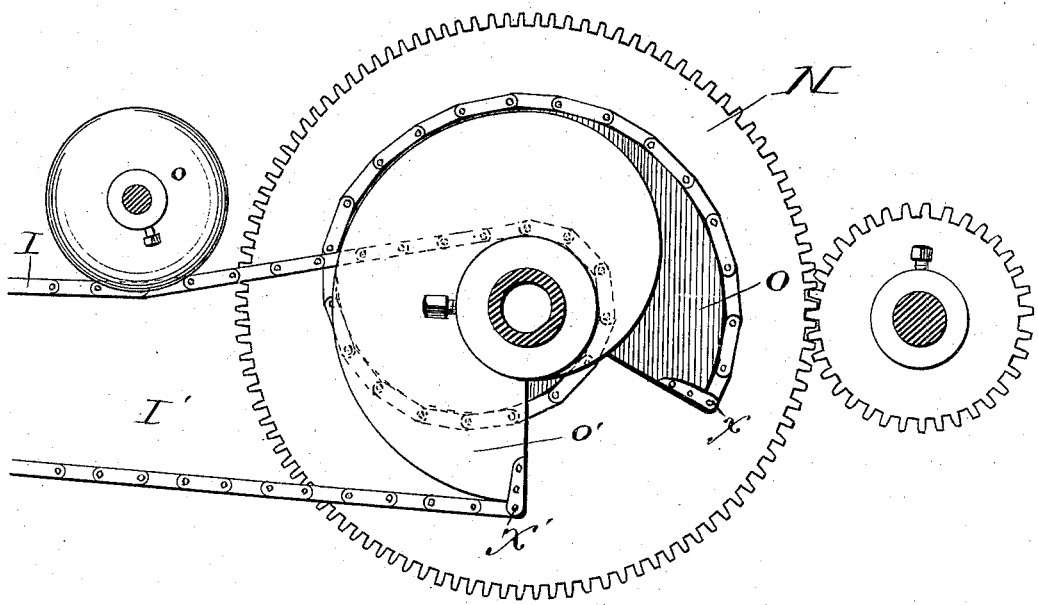
Witnesses:
Chas. E. Gaylord.
C. C. Linthicum.
Inventor:
Patrick Eneas McDonnell
by Douglas Dyrenforth
Attys.

UNITED STATES PATENT OFFICE.

PATRICK ENEAS McDONNELL, OF CHICAGO, ILLINOIS.

DRAFT-EQUALIZER.

SPECIFICATION forming part of Letters Patent No. 319,501, dated June 9, 1885.

Application filed March 8, 1884. (No model.)

*To all whom it may concern:*

Be it known that I, PATRICK ENEAS McDONNELL, a citizen of the United States, residing at Chicago, in the county of Cook and State of Illinois, have invented a new and Improved Draft-Equalizer; and I hereby declare the following to be a full, clear, and exact description of the same.

My invention relates to the class of devices for equalizing draft or pressure in cases wherein the force and resistance increase and decrease inversely to each other; and it is the object of my invention to provide a device the application of which will cause the draft or pressure on the one hand and the resistance on the other to be uniformly exerted.

To this end my invention consists, first, in providing a series of two or more disks upon a common axis and arranged in opposition to each other, and of equal or varying sizes and of proportionate or varying spiral, secured to which are flexible media connecting them severally with the power and object; secondly, in providing a series of spiral disks arranged in opposition to each other upon a common axis, secured to which are flexible media connecting one or more of them with the power and the other or others with the object, and arranged upon their several disks in such a manner that while the medium connected with the power is wound the medium connected with the object is unwound from its disk, and vice versa.

The drawing represents my invention in the form of a pair of disks arranged in opposition to each other.

O O' are opposite spiral disks arranged side by side upon a common axis, P, which may be in the form of a shaft or sleeve, depending upon the application of the device, as hereinafter described.

Secured to the disks O O', and preferably at the outermost points of the spirals, are chains I I', or other flexible media, either or both of which may or may not pass over a guide-roller, o, as shown, one chain being wound upon its disk while the other is unwound.

The operation is as follows: The chain I is assumed to be connected with the power and the chain I' with the object, in which case the chain I is wound upon the disk O, following the spiral, and the chain I' unwound from the disk O'. The revolution of the disk O will, of course, revolve the disk O'; hence the unwinding of the chain I from its disk will cause the chain I' to be wound upon its disk. The spiral arrangement of the disks provides a means of changing the leverage at which the draft or resistance of the chains is exerted. Thus in the position shown in the drawing the draft of the chain I is at first upon the shortest leverage, thus requiring the greatest amount of power to accomplish the revolution of the disk in a given period of time, and the draft, continuing, changes gradually to the longest leverage, at which time the power required is least; on the other hand, in the case of the chain I' and disks O', this operation is reversed, and the draft of the chain I' is first upon the longest leverage and changes gradually to the shortest. This arrangement is particularly adapted to cases where the force and resistance increase and decrease in equal ratio. Where the ratio is not equal, the relative sizes of the disks may be different or the varying diameters of the spirals be different, and the reduction in leverage more gradual in one than in the other. Instead of varying the size of the disks, the number of the opposing disks may be varied—for instance, two, three, or more may be opposed to one, or three or more to two, and so on.

In the drawing I have shown a means for transmitting the draft of the chain I or I', which may be found useful in many connections, as in the case of the gas-engine for which I made application for Letters Patent October 14, 1884, (Serial number 145,439.) It consists of a wheel, N, upon an independent axis, which is engaged by the disk O in one direction through the medium of a pawl and ratchet or similar means.

It is quite obvious that instead of forming the disks O O' separately, they may be combined into one, being otherwise constructed and arranged substantially in the manner described of two separate disks, and such a construction is included in my invention.

What I claim as new, and desire to secure by Letters Patent, is—

1. A draft-equalizing mechanism comprising spiral pulleys upon a common axis arranged in opposition to each other, and flexible connecting media secured thereto, substantially as described.

2. A draft-equalizing mechanism comprising spiral pulleys upon a common axis arranged in opposition to each other, and flexible connecting media arranged to wind upon the pulleys in the line of their spirals when the pulleys are revolved, and secured thereto in such a manner that when the medium moving in one spiral is wound upon its pulley the opposing medium will be unwound, substantially as described.

3. A draft-equalizing mechanism comprising spiral disks O O', arranged in opposition to each other upon a common axis, and flexible connecting media I I', secured thereto, substantially as described.

PATRICK ENEAS McDONNELL.

In presence of—
FRANK H. HAGUE,
S. J. BOLES.